US009633683B2

(12) United States Patent
Lee et al.

(10) Patent No.: US 9,633,683 B2
(45) Date of Patent: Apr. 25, 2017

(54) MODE CONVERSION VIA TAPERED WAVEGUIDE

(71) Applicant: Seagate Technology LLC, Cupertino, CA (US)

(72) Inventors: Tae-Woo Lee, Eden Prairie, MN (US); Yi-Kuei Ryan Wu, Bloomington, MN (US); Pierre Asselin, Richfield, MN (US); Werner Scholz, Camberwell (AU)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/626,206

(22) Filed: Feb. 19, 2015

(65) Prior Publication Data
US 2016/0247525 A1    Aug. 25, 2016

(51) Int. Cl.
*G11B 5/48*    (2006.01)
*G02B 6/12*    (2006.01)
(Continued)

(52) U.S. Cl.
CPC .......... *G11B 5/6088* (2013.01); *G02B 6/1228* (2013.01); *G02B 6/136* (2013.01); *G11B 5/314* (2013.01); *G11B 2005/0021* (2013.01)

(58) Field of Classification Search
CPC ............ G11B 2005/0021; G11B 5/314; G11B 5/6088; G11B 2005/0005; G11B 5/3116; G11B 11/10534; G11B 5/105; G11B 5/486; G11B 5/4866; G11B 7/122; G11B 7/1387; G11B 11/10565; G11B 11/10578; G11B 11/10584; G11B 5/455; G11B 7/00454; G11B 7/00745; G11B 7/0938; G11B 7/1372; G11B 7/1374; G11B 7/1376; G11B 7/261; G02B 6/105; G02B 6/1228; G02B 6/262; G02B 6/305; G02B 6/12007; G02B 2006/12176; G02B 2006/12195; G02B 6/12002; G02B 6/12028; G02B 6/122;
(Continued)

(56) References Cited

U.S. PATENT DOCUMENTS 7,949,218 B2    5/2011    Gage et al.
8,189,972 B2    5/2012    Little
(Continued)

*Primary Examiner* — Dionne H Pendleton
(74) *Attorney, Agent, or Firm* — Hollingsworth Davis, LLC

(57) ABSTRACT

An apparatus includes a write head comprising a near-field transducer at a media-facing surface of the write head and a waveguide extending along a light-propagation direction. The waveguide is configured to receive light emitted from a light source at a fundamental transverse electric mode. The waveguide is configured to deliver the light to the near-field transducer at a transverse magnetic mode which directs surface plasmons to a recording medium in response thereto. The waveguide comprises a core with first and second tapers separated by a straight portion of constant cross sectional width. The first and second tapers successively decrease a cross-sectional width of the core as it nears the near-field transducer. The waveguide includes an end portion between the second taper and the near field transducer. The end portion comprises a top cladding layer, aside cladding layer, and a bottom cladding layer on the side cladding layer.

17 Claims, 8 Drawing Sheets

(51) Int. Cl.
  *G02B 6/27* (2006.01)
  *G11B 5/60* (2006.01)
  *G02B 6/136* (2006.01)
  *G02B 6/122* (2006.01)
  *G11B 5/31* (2006.01)
  *G11B 5/00* (2006.01)

(58) Field of Classification Search
  CPC  G02B 6/29352; G02B 6/4204; G02B 6/4214;
       G02B 6/1226; G02B 6/136; G02B 1/00;
       G02B 1/007; G02B 1/115; G02B
       2006/12061; G21K 1/00; H01P 1/165;
       H01P 3/122; H01P 3/16; B82Y 20/00
  See application file for complete search history.

(56) References Cited

U.S. PATENT DOCUMENTS

| | | | |
|---|---|---|---|
| 8,228,779 B2 | 7/2012 | Peng et al. | |
| 8,755,256 B2 | 6/2014 | Maletzky et al. | |
| 2012/0082016 A1* | 4/2012 | Komura | B82Y 20/00 369/13.33 |
| 2012/0113770 A1* | 5/2012 | Stipe | G11B 5/6088 369/13.33 |
| 2013/0322816 A1* | 12/2013 | Takahashi | G02B 6/1228 385/27 |
| 2014/0254333 A1* | 9/2014 | Komura | H01P 1/165 369/13.17 |
| 2014/0286147 A1* | 9/2014 | Aoki | G21K 1/00 369/13.17 |
| 2015/0086153 A1* | 3/2015 | Ono | G02B 6/34 385/11 |

* cited by examiner

Section A-A'

Section A-A'

Section A-A'

MODE CONVERSION VIA TAPERED WAVEGUIDE

SUMMARY

Embodiments are directed to a write head comprising a near-field transducer at a media-facing surface of the write head and a waveguide extending along a light-propagation direction. The waveguide is configured to receive light emitted from a light source at a fundamental transverse electric ($TE_{00}$) mode. The waveguide is configured to deliver the light to the near-field transducer at a transverse magnetic mode ($TM_{00}$), which directs surface plasmons to a recording medium in response thereto. The waveguide comprises a core with first and second tapers separated by a straight portion of constant cross sectional width. The first and second tapers successively decrease a cross-sectional width of the core as it nears the near-field transducer. The waveguide includes an end portion between the second taper and the near field transducer. The end portion comprises a top cladding layer on a first substrate-parallel surface of the core, a side cladding layer that encompasses sides of the core and a second substrate-parallel surface of the core that faces away from the first substrate-parallel surface, and a bottom cladding layer on the side cladding layer. The side cladding layer has a different index of refraction than the top and bottom cladding layers.

Some embodiments include a method comprising receiving light emitted by a light source at a fundamental transverse electric ($TE_{00}$) mode. The method includes delivering the light via a waveguide to a near-field transducer at a fundamental transverse magnetic mode ($TM_{00}$). The waveguide comprises a core with first and second tapers separated by a straight portion of constant cross sectional width. The first and second tapers successively decrease a cross-sectional width of the core as it nears the near-field transducer. The waveguide comprises an end portion between the second taper and the near field transducer. The end portion comprises a top cladding layer on a first substrate-parallel surface of the core, a side cladding layer that encompasses sides of the core and a second substrate-parallel surface of the core that faces away from the first substrate-parallel surface, and a bottom cladding layer on the side cladding layer. The side cladding layer has a different index of refraction than the top and bottom cladding layers. The method includes directing surface plasmons to a recording medium in response to delivering light to the near-field transducer.

Various embodiments include a system comprising a light source exciting light in a fundamental transverse electric mode ($TE_{00}$). The system includes a near-field transducer at a media-facing surface of the write head. A waveguide extending along a light-propagation direction is configured to receive light from a light source at a fundamental transverse electric ($TE_{00}$) mode. The waveguide is configured to deliver the light to the near-field transducer at a fundamental transverse magnetic mode ($TM_{00}$), which directs surface plasmons to a recording medium in response thereto. The waveguide comprises a mode converter between the light source and the multiplexor. The mode converter converts the light to a $TE_{10}$ mode. The waveguide comprises a core with first and second tapers separated by a straight portion of constant cross sectional width. The first and second tapers successively decrease a cross-sectional width of the core as it nears the near-field transducer. The waveguide comprises an end portion between the second taper and the near field transducer. The end portion comprises a top cladding layer on a first substrate-parallel surface of the core, a side cladding layer that encompasses sides of the core and a second substrate-parallel surface of the core that faces away from the first substrate-parallel surface, and a bottom cladding layer on the side cladding layer. The side cladding layer has a different index of refraction than the top and bottom cladding layers.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
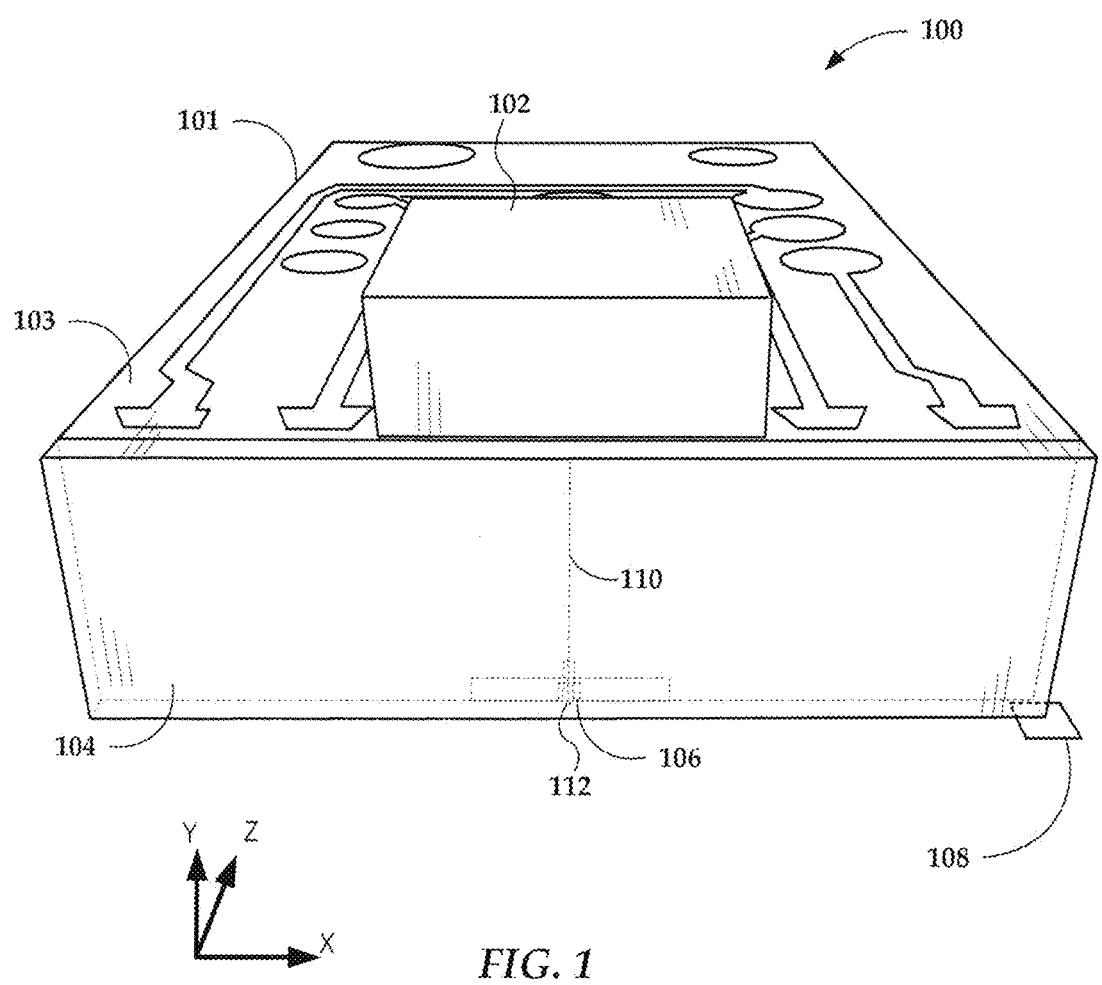
FIG. 1 is a perspective view of a hard drive slider that includes a waveguide in accordance with embodiments described herein.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

A light source such as an edge-emitting laser diode may have a $TM_{00}$-like output beam profile. However, a phase-shifted higher-order mode, e.g., $TE_{10}$, is desired for coupling with some configurations of a plasmonic transducer. Embodiments below include a waveguide system that provides mode order conversion rotation including a $TE_{10}$-$TM_{00}$ hybrid mode, which includes both $TE_{10}$ and $TM_{00}$ components. It will be understood that the embodiments below may be configured to excite other higher-order modes, e.g., a $TE(n, m)$ mode, wherein $n>0$ and $m\geq 0$.

According to various implementations, waveguide supporting $TE_{10}$-$TM_{00}$ hybrid mode is tapered down to convert $TE_{10}$ to $TM_{00}$ mode. Using a waveguide with broken symmetry that supports $TE_{10}$-$TM_{00}$ hybrid mode, $TE_{10}$ mode converted from $TE_{00}$ is fed into wider width core where $TE_{10}$ mode is supported. Waveguide is tapered down to a waveguide width that supports the hybrid mode. In some cases, the waveguide core width is further tapered down into a width that separates $TM_{00}$ mode and $TE_{10}$ mode. The waveguide may pass through a mode attenuation region where $TE_{10}$ is filtered out leaving substantially only $TM_{00}$ mode.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a hybrid mode converting waveguide system 110, are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
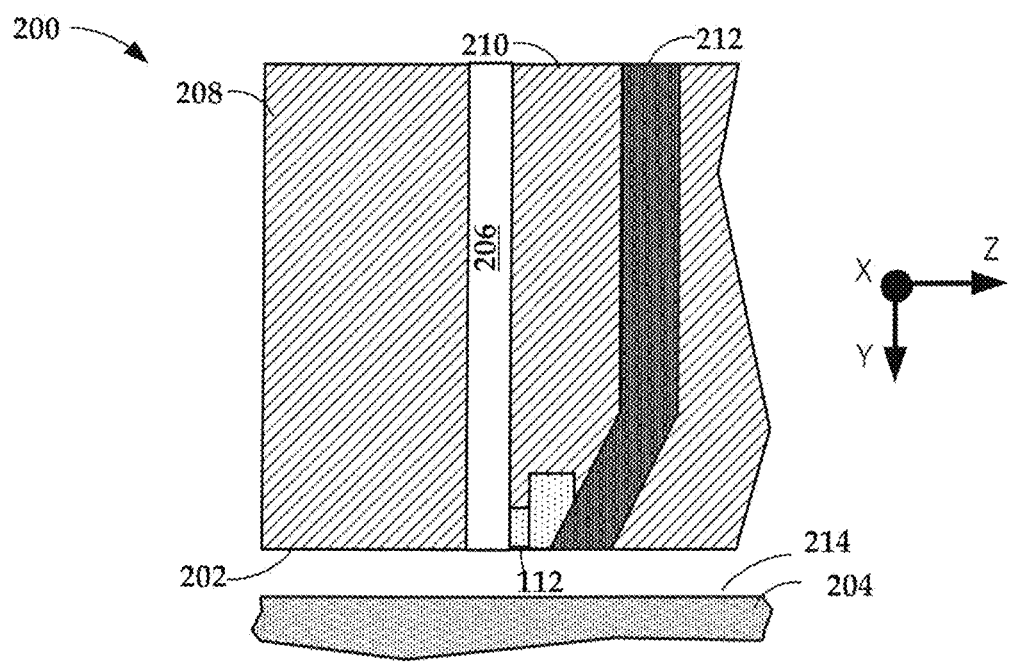
FIG. 2 is a cross-sectional view shows details of a HAMR apparatus according to an example embodiment.

In reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2A, the media-facing surface 202 is arranged parallel to the x-z plane. A waveguide core 206 may be disposed proximate the NFT 112, which is located at or near the media writing surface 214.

The waveguide core 206 surrounded by cladding layers 208, 210. The waveguide core 206 and cladding layers 208, 210 may be made from dielectric materials such as $Al_2O_3$, SiOxNy, $SiO_2$, $Ta_2O_5$, $TiO_2$, ZnS, SiNx, $Nb_2O_5$, AlN, $Hf_2O_3$, $Y_2O_3$, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. A portion of the waveguide core (not shown) converts the light to a $TE_{10}$-$TM_{00}$ hybrid mode. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a recording pole 212 of the read/write head that is located alongside the NFT 112. The recording pole 212 generates a magnetic field (e.g., perpendicular field) used in changing the magnetic orientation of the hotspot during writing.

Figure 3:
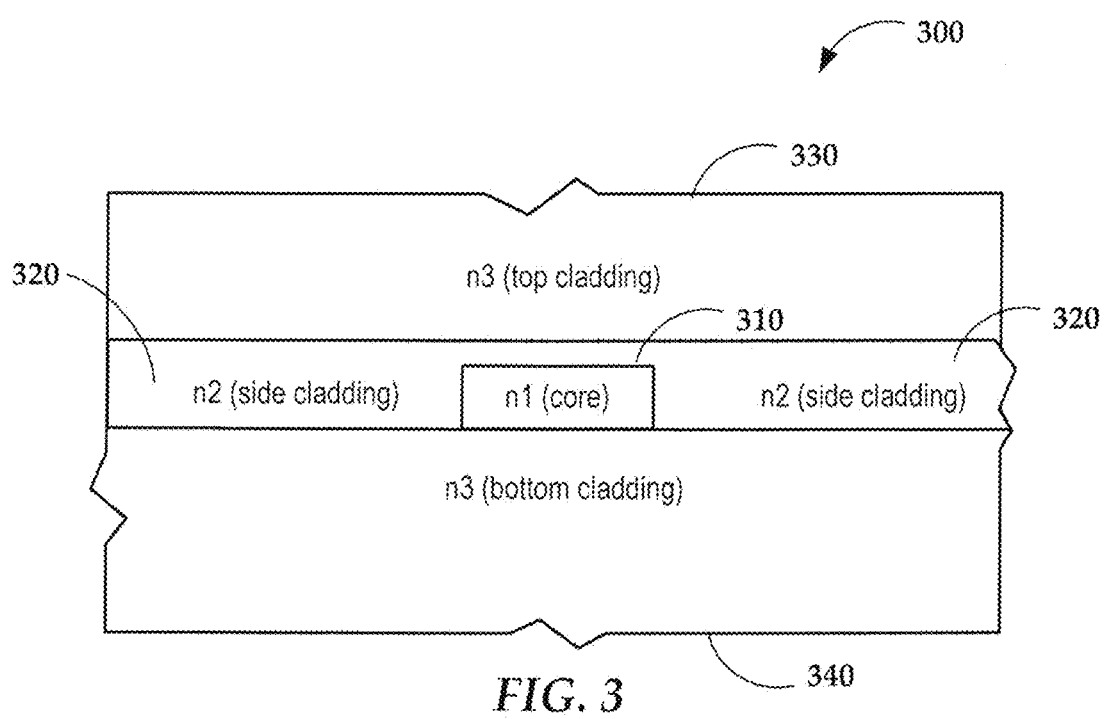
FIG. 3 shows a cross sectional view of a waveguide in accordance with various embodiments.
Figure 3:
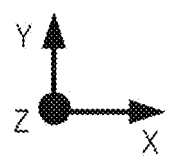

FIG. 3 shows a cross sectional view of a waveguide 300 having an index of refraction, n1. According to various embodiments the waveguide has side cladding 320 having an index of refraction, n2. The waveguide may also have top cladding 330, having an index of refraction of n3 and a bottom cladding 340 having an index of refraction n3. In some cases the index of refraction of the top cladding 330 is different than the index of refraction of the bottom cladding 340 or side cladding 320.

Figure 4:
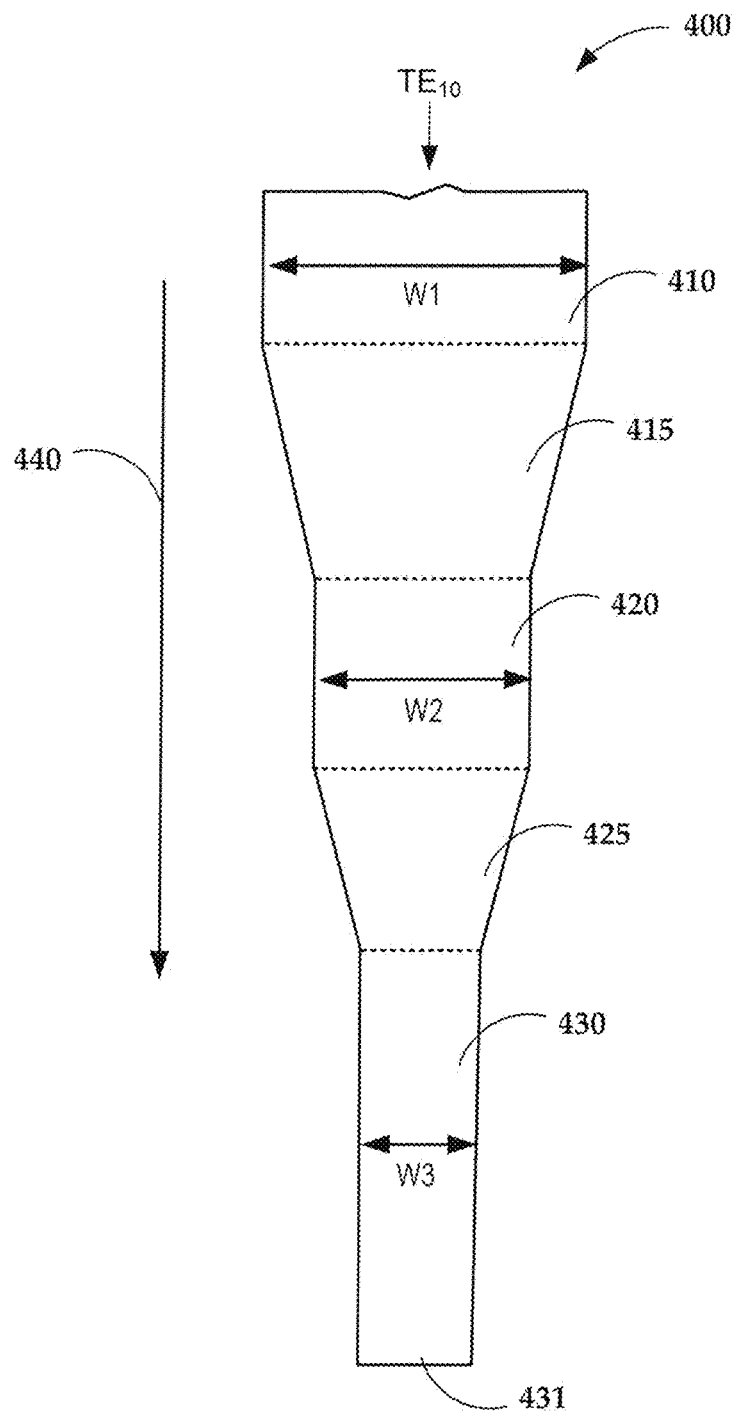
FIG. 4 illustrates a waveguide core with two tapered sections in accordance with various embodiments described herein.

According to various implementations material distribution of the waveguide core is symmetric in lateral dimension (x-direction as seen in FIG. 3) and material distribution has broken symmetry in transverse dimension (z-direction as seen in FIG. 3). This broken symmetry may be accomplished by creating a waveguide core with at least two tapered sections. FIG. 4 illustrates a waveguide core 400 with two tapered sections in accordance with various embodiments described herein. The waveguide core 400 receives light at a transverse electric mode, e.g., $TE_{10}$. The waveguide core 400 includes a first portion 410 extending towards the light source and having a first constant crosstrack core width, W1. In some cases, light is emitted from the light source at a $TE_{00}$ mode. The waveguide core 400 may include a mode converter (not shown) between the light source and a multiplexor and the mode converter converts the light to a $TE_{10}$ mode.

According to various embodiments, the waveguide core 400 includes a first tapered section 415 between the first portion 410 and a straight portion 420. The first tapered section 415 has a larger core width at the end adjacent to the first portion 410 than the core width of the first tapered section 415 adjacent to the straight portion 420. In some cases, the first tapered section 415 has a cross-sectional width that successively decreasing core width of the core as it nears the near-field transducer in the direction of arrow 440. The straight portion has a second constant crosstrack width, W2. The core width of the straight portion 420 may support a $TE_{10}$-$TM_{00}$ hybrid mode, for example.

A second tapered section 425 is located between the straight portion 420 and an end portion 430. The second tapered section 425 has a larger core width at the end adjacent to the straight portion 420 than the width of the second tapered section 425 adjacent to the end portion 430. In some cases, the second tapered section 425 has a cross-sectional core width that successively decreasing width of the core as it nears the near-field transducer in the direction of arrow 440. The end portion 430 has a third constant crosstrack width, W3. The core width of the end portion 430 may support a $TM_{00}$ mode, for example. According to various implementations, W1>W2>W3. A tip 431 of the end portion 430 is located proximate a near-field transducer (not shown).

Figure 5A:
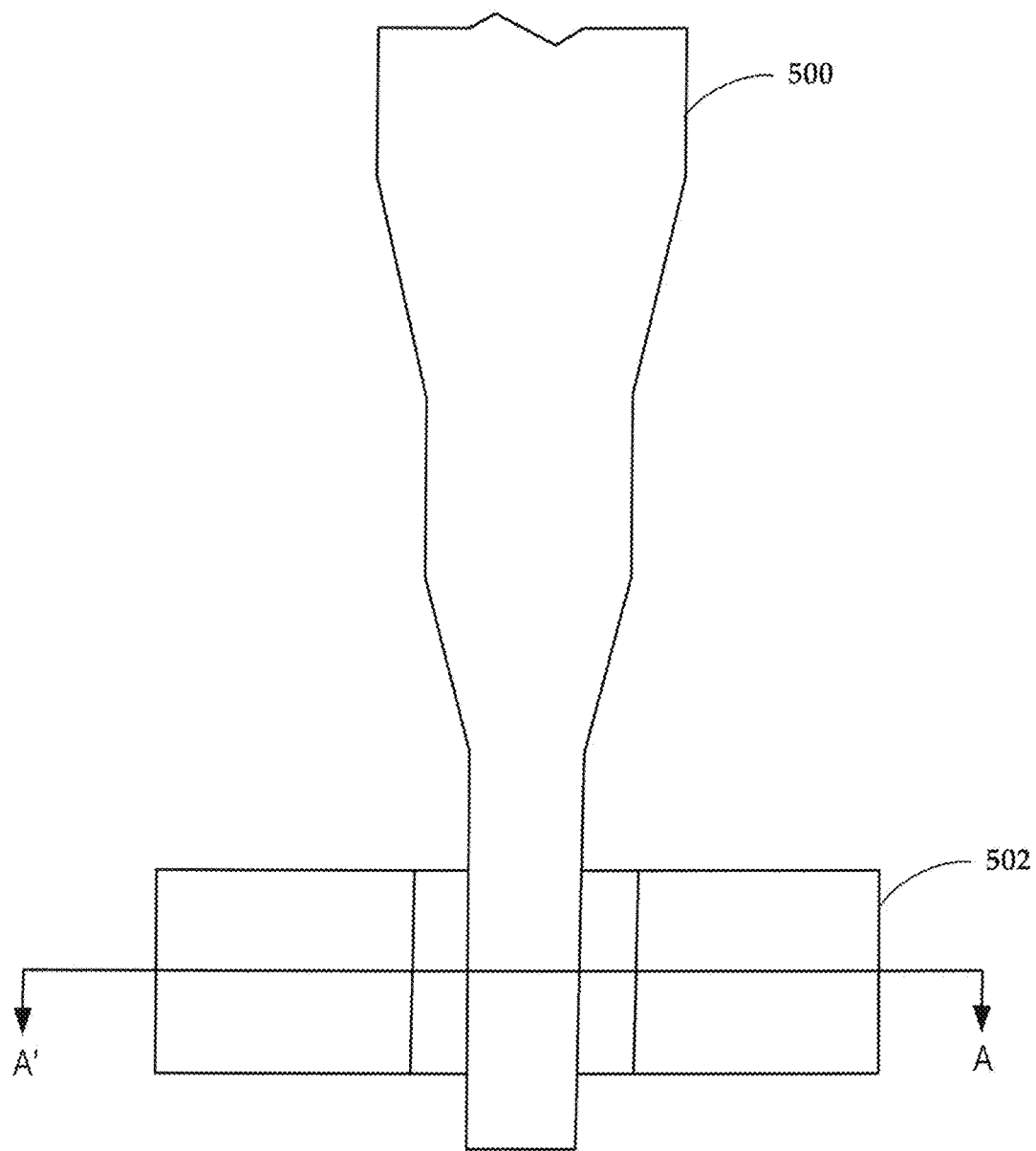
FIG. 5A illustrates a waveguide with two tapered sections according to an example embodiment.
Figure 5B:
FIGS. 5B-5D illustrate different cladding configurations according to various aspects.
Figure 5C:
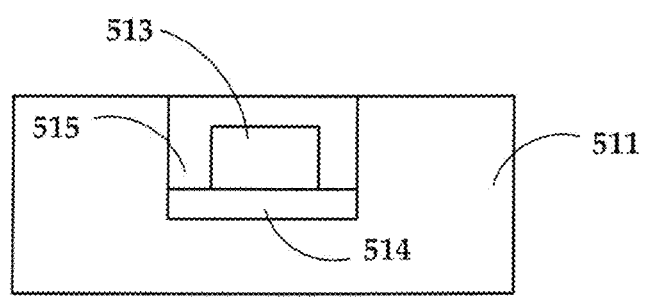
Figure 5D:
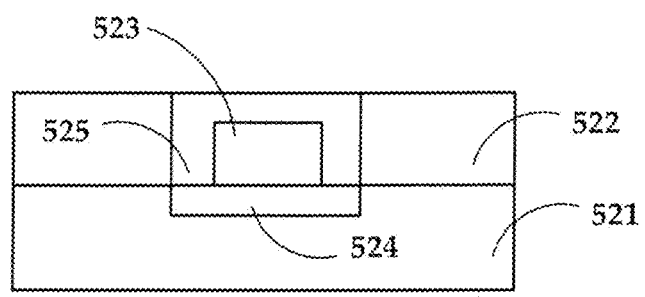

The waveguide may have different cladding configurations. FIG. 5A illustrates waveguide 500 having two tapered sections. A $TE_{10}$ attenuator 502 is located at a distal end of the waveguide 500 (e.g., end proximate the near-field transducer) FIGS. 5B-5D illustrate different cladding configurations of the $TE_{10}$ attenuator 502 as viewed from the A-A' direction shown in FIG. 5A. FIGS. 5B-5D illustrate the waveguide core at the end portion of the waveguide. FIG. 5B illustrates a waveguide core 533 with a cladding layer 536. According to various embodiments, the core 533 comprises TaOx. In some cases, the waveguide core 533 has a different index of refraction than the cladding layer 536. The waveguide core at the end portions acts as a $TE_{10}$ attenuator such that the width of the core 533 is narrow enough, e.g., 900 nm, to substantially filter out the $TE_{10}$ leaving the $TM_{00}$.

FIG. 5C illustrates a waveguide core 513. A side cladding layer 515, a bottom cladding layer 514, and a first additional cladding layer 511 are also shown. In some cases, the index of refraction of the core 513, the side cladding layer 515, the bottom cladding layer 514 and the first additional cladding layer 511 are different from one another. The index of refraction of the first additional cladding layer 5111 is greater than an effective index of refraction needed to support a $TM_{00}$ mode and less than an effective index of refraction needed to support a $TE_{10}$ mode.

FIG. 5D illustrates a waveguide core 523. A side cladding layer 525, a bottom cladding layer 524, a first additional cladding layer 521, and a second additional cladding layer 522 are also shown. In some cases, the index of refraction of the core 523, the side cladding layer 525, the bottom cladding layer 524, the first additional cladding layer 521, and the second additional cladding layer 522 are different from one another. One or more of the index of refraction of the core 523, the side cladding layer 525, the bottom cladding layer 524, the first additional cladding layer 521, and the second additional cladding layer 522 may have the same index of refraction. The index of refraction of the first additional cladding layer 521 is greater than an effective index of refraction needed to support a $TM_{00}$ mode and less than an effective index of refraction needed to support a $TE_{10}$ mode. The index of refraction of the second additional cladding layer 522 may be greater than the index of refraction of the side cladding layer 525 and less than the index of refraction of the core 523. According to various configurations, the side cladding layer comprises AlOx and the bottom cladding layer comprises SiOx. According to various embodiments described herein, the cladding configurations of FIGS. 5B-5D include a top cladding layer. The top cladding layer may have an index of refraction that is substantially the same as the bottom cladding layer. In some cases, the top cladding layer has an index of refraction that is different than the index of refraction of the bottom cladding layer.

Figure 6:
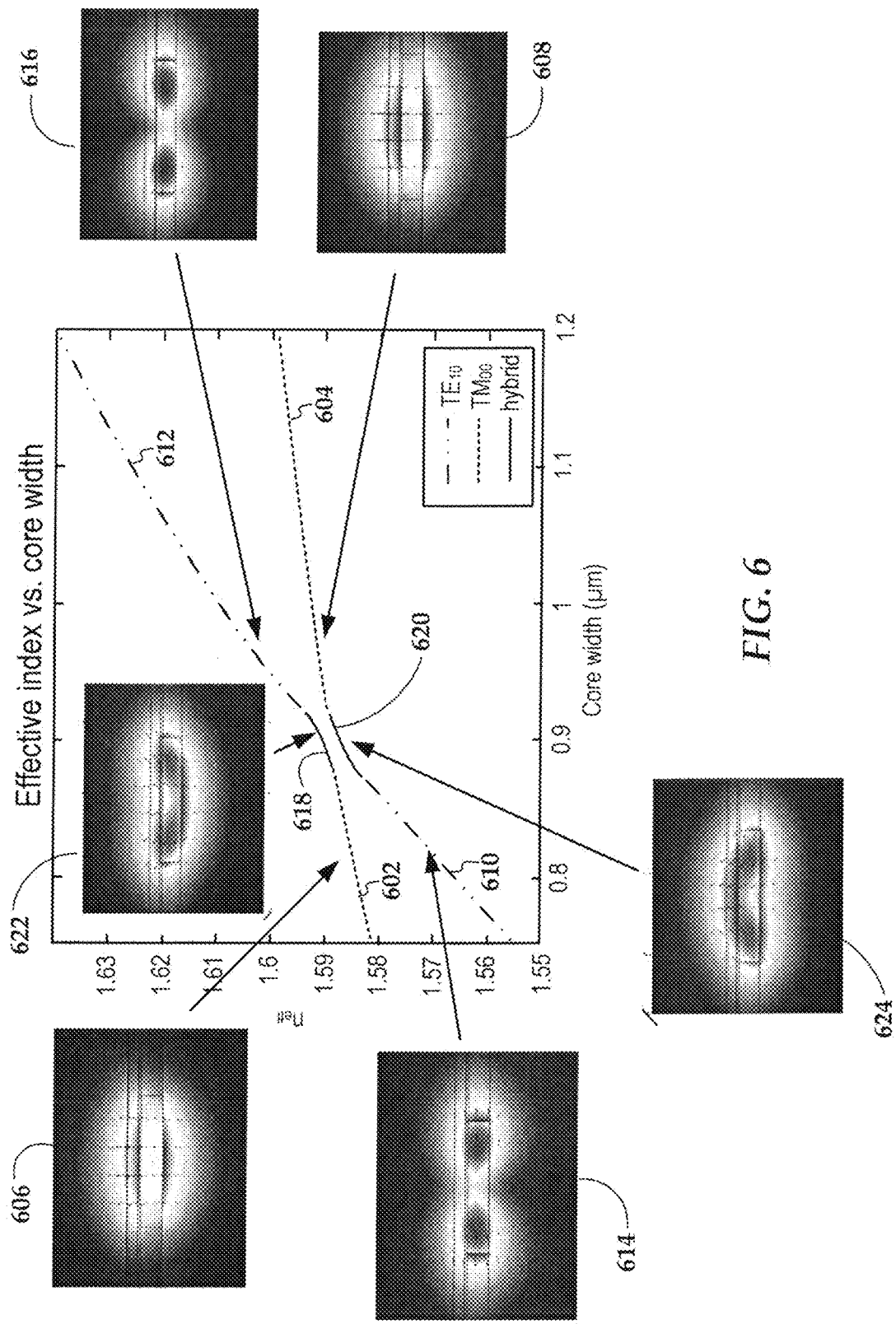
FIG. 6 is a graph illustrating the effective index of refraction at various core widths according to example embodiments.

FIG. 6 show illustrates the various modes exhibited by a $TE_{10}$ attenuator for various combination of effective index of refraction and core widths. A TaOx core having an index of refraction of 2.06 and a height of 140 nm was used. The side cladding comprised AlOx and had an index of refraction of 1.67. The bottom cladding comprised SiOx and had an index of refraction of 1.46. A $TM_{00}$ converter was initially excited by a $TE_{10}$ mode, e.g., provided by a mode converter between the attenuator and a laser that emits at a $TE_{00}$ mode. Regions 602 and 604 result in a $TM_{00}$ mode, a shape of which is indicated by intensity plots 606, 608. Regions 610 and 612 result in a $TE_{10}$ mode, a shape of which is indicated by intensity plots 614, 616. Regions 618 and 620 result in a hybrid mode, a shape of which is indicated by intensity plots 622, 624. To deliver the desired mode to the near-field transducer, the attenuator may be configured to use parameters of regions 602 or 610, for example.

Figure 7:
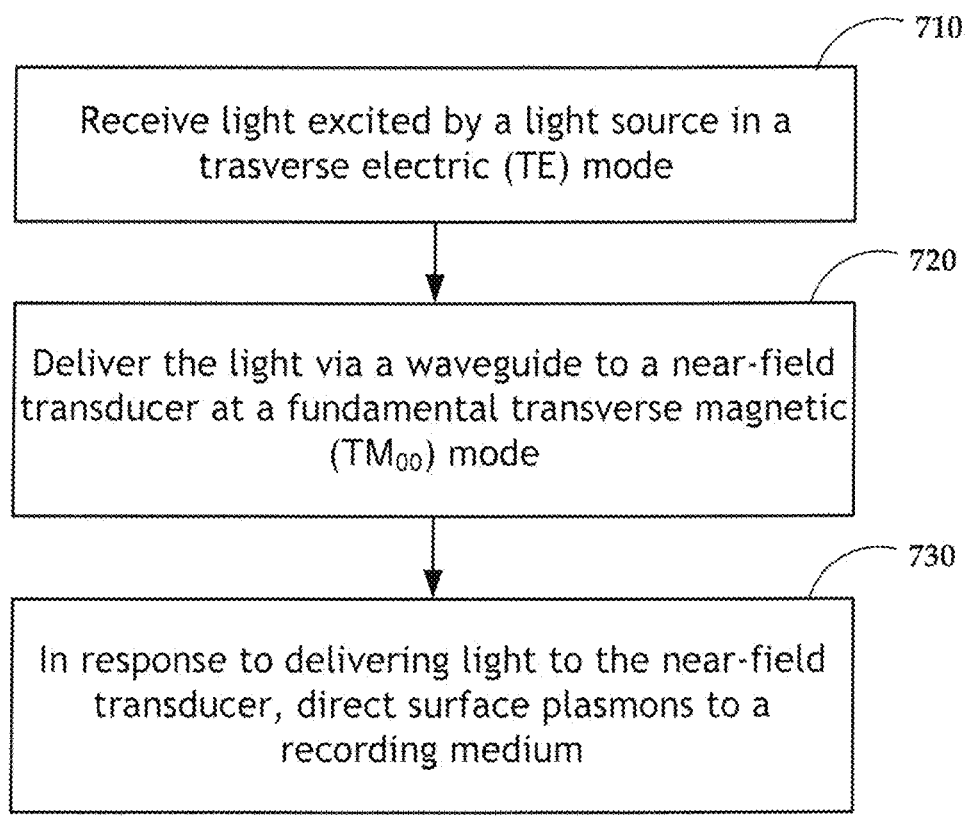
FIG. 7 illustrates a flow diagram according to various embodiments described herein.

FIG. 7 is a flow diagram in accordance with various embodiments described herein. Light excited by a light source is received 710 in a fundamental transverse electric ($TE_{00}$) mode. Light is delivered 720 via a waveguide to a near-field transducer at a fundamental transverse magnetic mode ($TM_{00}$). According to various embodiments the waveguide comprises a core with first and second tapers separated by a straight portion of constant cross sectional width. The first and second tapers successively decrease a cross-sectional width of the core as it nears the near-field transducer. The waveguide also comprises an end portion between the second taper and the near field transducer. In response to delivering 720 light to the near-field transducer, surface plasmons are directed 730 to a recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

The invention claimed is:

1. A write head comprising:
  a near-field transducer at a media-facing surface of the write head;
  a waveguide extending along a light-propagation direction and configured to receive light emitted from a light source at a fundamental transverse electric ($TE_{00}$) mode, the waveguide configured to deliver the light to the near-field transducer at a transverse magnetic mode ($TM_{00}$), which directs surface plasmons to a recording medium in response thereto, the waveguide comprising:
    a core with first and second tapers separated by a straight portion of constant cross sectional width, the first and second tapers successively decreasing a cross-sectional width of the core as it nears the near-field transducer, the core comprising:
    a first portion extending towards the light source and having a first constant crosstrack width, W1, the straight portion having a second constant crosstrack width W2,
    an end portion between the second taper and the near field transducer, the end portion having a third constant crosstrack width W3, the first taper being between the first and straight portions and the second taper being between the straight and end portions, such that W1>W2>W3, the end portion comprising: a top cladding layer on a first substrate-parallel surface of the core; a side cladding layer that encompasses sides of the core and a second substrate-parallel surface of the core that faces away from the first substrate-parallel surface; and a bottom cladding layer on the side cladding layer, the side cladding layer have a different index of refraction than the top and bottom cladding layers, wherein the core has an index of refraction that is different than any of the top cladding layer, the bottom cladding layer, and the side cladding layer.

2. The write head of claim 1, the waveguide further comprising a mode converter between the light source and a multiplexor, the mode converter converting the light to a $TE_{10}$ mode.

3. The write head of claim 2, wherein the straight portion supports a combined mode comprising the $TM_{00}$ mode and the $TE_{10}$ mode.

4. The write head of claim 3, wherein the end portion is configured to filter out the $TE_{10}$.

5. The write head of claim 1, further comprising a first additional cladding layer that encompasses sides of the bottom cladding layer.

6. The write head of claim 5, wherein the first additional cladding layer encompasses sides of the side cladding layer.

7. The write head of claim 5, further comprising a second additional cladding layer that encompasses sides of the side cladding layer.

8. The write head of claim 1, wherein the top cladding layer has an index of refraction that is less than an index of refraction of the core and greater than an index of refraction of the side cladding layer.

9. The write head of claim 1, wherein the core comprises TaOx.

10. The write head of claim 1, wherein the side cladding layer comprises AlOx and at least one of the top cladding layer and the bottom cladding layer comprises SiOx.

11. A method comprising:
  receiving light emitted by a light source at a fundamental transverse electric ($TE_{00}$) mode
  delivering the light via a waveguide to a near-field transducer at a fundamental transverse magnetic mode ($TM_{00}$),
  converting the light to a $TE_{10}$ mode before delivering the light at the $TM_{00}$ mode, the waveguide comprising:
    a core with first and second tapers separated by a straight portion of constant cross sectional width, the first and second tapers successively decreasing a cross-sectional width of the core as it nears the near-field transducer;
    an end portion between the second taper and the near field transducer, the end portion comprising: a top cladding layer on a first substrate-parallel surface of the core; a side cladding layer that encompasses sides of the core and a second substrate-parallel surface of the core that faces away from the first substrate-parallel surface; and a bottom cladding layer on the side cladding layer, the side cladding layer have a different index of refraction than the top and bottom cladding layers; and
  in response to delivering light to the near-field transducer, directing surface plasmons to a recording medium.

12. The method of claim 11, further comprising exciting, via the straight portion, a combined mode comprising the $TM_{00}$ mode and the $TE_{10}$ mode.

13. The method of claim 12, further comprising filtering out the $TE_{10}$ via the end portion.

14. The method of claim 11, wherein the top cladding layer has an index of refraction that is less than an index of refraction of the core and greater than an index of refraction of the side cladding layer.

15. The method of claim 11, wherein core further comprises a first portion extending towards the light source and having a first constant crosstrack width, W1, the straight portion having a second constant crosstrack width W2, and the end portion having a third constant crosstrack width W3, the first taper being between the first and straight portions and the second taper being between the straight and end portions, such that W1>W2>W3.

16. A system comprising:
a light source exciting light in a fundamental transverse electric mode ($TE_{00}$);
a near-field transducer at a media-facing surface of the write head;
a waveguide extending along a light-propagation direction and configured to receive light from a light source at a fundamental transverse electric ($TE_{00}$) mode, the waveguide configured to deliver the light to the near-field transducer at a fundamental transverse magnetic mode ($TM_{00}$), which directs surface plasmons to a recording medium in response thereto, the waveguide comprising:
a mode converter between the light source and the multiplexor, the mode converter converting the light to a $TE_{10}$ mode;
a core with first and second tapers separated by a straight portion of constant cross sectional width, the first and second tapers successively decreasing a cross-sectional width of the core as it nears the near-field transducer;
an end portion between the second taper and the near field transducer, the end portion comprising: a top cladding layer on a first substrate-parallel surface of the core; a side cladding layer that encompasses sides of the core and a second substrate-parallel surface of the core that faces away from the first substrate-parallel surface; and a bottom cladding layer on the side cladding layer, the side cladding layer have a different index of refraction than the top and bottom cladding layers.

17. The system of claim 16, wherein core further comprises a first portion extending towards the light source and having a first constant crosstrack width, W1, the straight portion having a second constant crosstrack width W2, and the end portion having a third constant crosstrack width W3, the first taper being between the first and straight portions and the second taper being between the straight and end portions, such that W1>W2>W3.

* * * * *